Aug. 22, 1961   M. LEFEBVRE   2,997,358
DEVICES FOR MEASURING ACCELERATIONS AND SPEEDS
Filed May 20, 1958   2 Sheets-Sheet 1
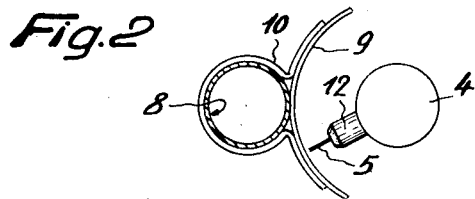
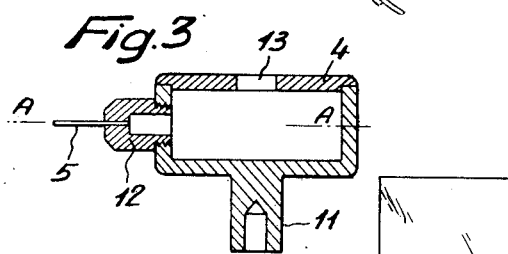
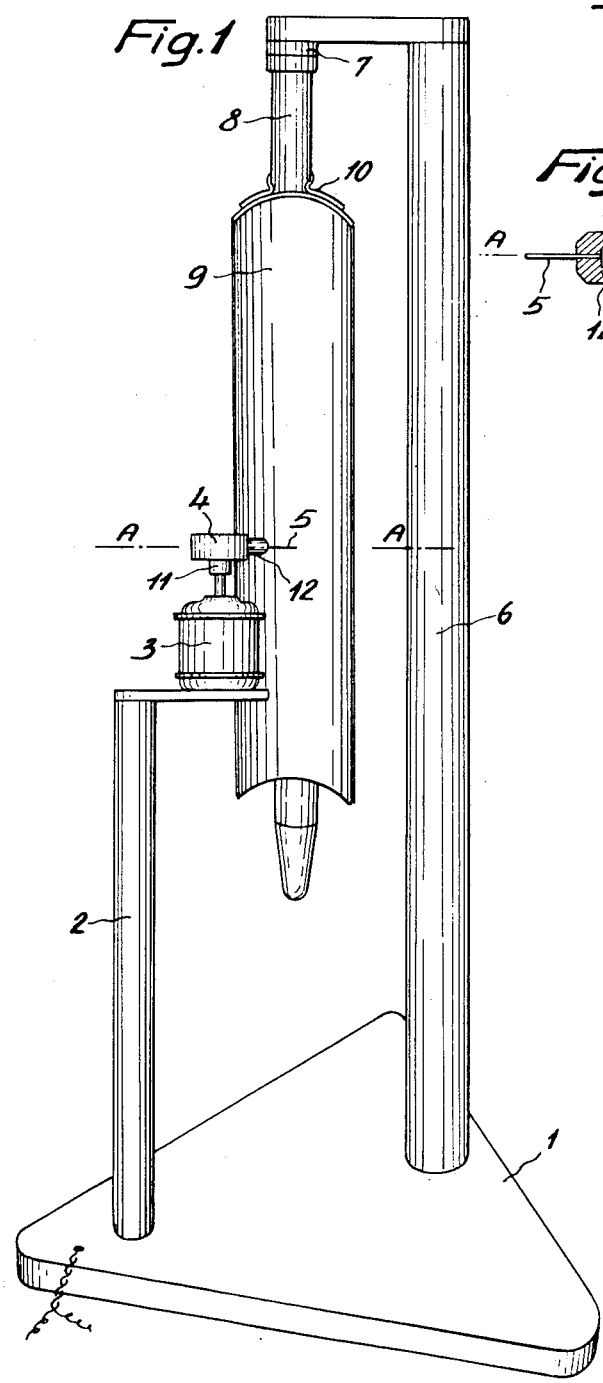
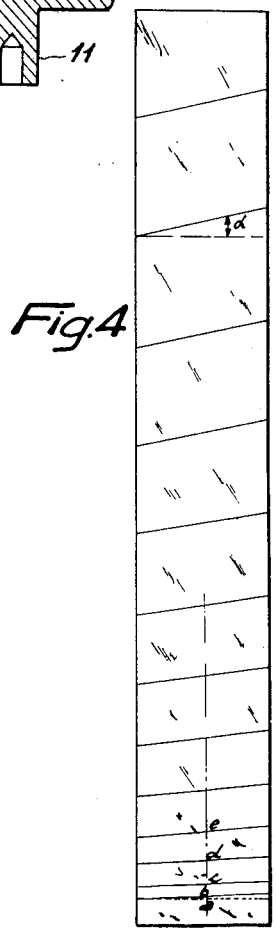
Inventor:
Michel Lefebvre
by:
Michael S. Striker
Attorney Aug. 22, 1961  M. LEFEBVRE  2,997,358
DEVICES FOR MEASURING ACCELERATIONS AND SPEEDS
Filed May 20, 1958  2 Sheets-Sheet 2
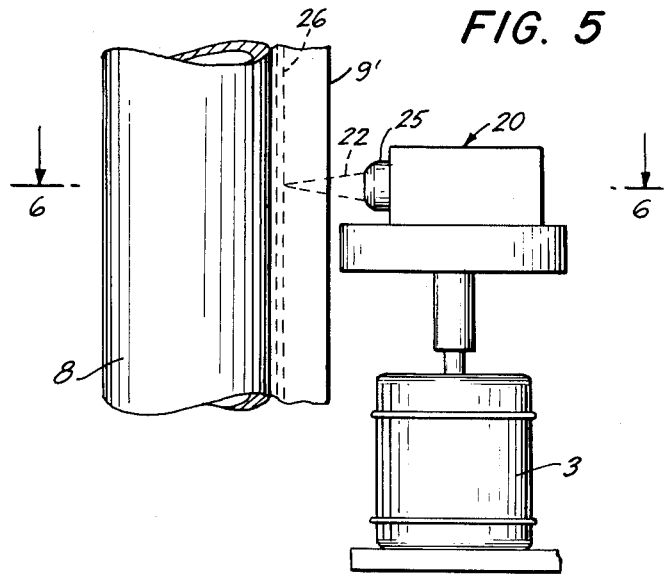
FIG. 5
FIG. 6
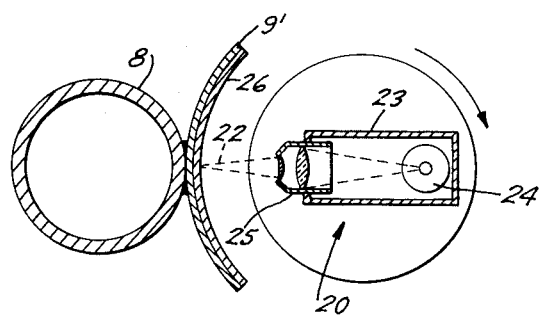
INVENTOR.
Michel Lefebvre
BY
Richard S. Striker

United States Patent Office 2,997,358
Patented Aug. 22, 1961

---

2,997,358
DEVICES FOR MEASURING ACCELERATIONS AND SPEEDS
Michel Lefebvre, 3 Rue Hugues Le Roux,
Le Havre, Seine Maritime, France
Filed May 20, 1958, Ser. No. 736,574
Claims priority, application France May 20, 1957
7 Claims. (Cl. 346—7)

This invention relates to recording devices for the precise measurement of the accelerations and speeds of bodies in rectilinear movement, of the type in which use is made of the trace left by a recording member, turning about an axis parallel to the direction of the movement, on a support linked to the piece in motion.

The devices in question have not hitherto been entirely satisfactory, especially with regard to precision, either because all the causes of friction have not been eliminated, or because of imperfections or lack of precision of the recording means, or because the type of support employed does not permit percise readings.

The device according to the invention comprises essentially the combination:

(a) of an ink container turning at constant speed on an axis of rotation parallel to the direction of the movement, said ink container being provided with a very fine nozzle perpendicular to the axis of rotation, from which nozzle the ink is ejected in a fine jet by centrifugal force.

(b) of a curved support in the form of a cylinder or portion of a cylinder, the axis of which coincides with the axis of rotation of the ink container, the radius of the cylinder being slightly greater that that of the circle described by the end of the ink ejection nozzle, said support being linked by any appropriate means to the piece whose speed it is desired to measure.

The invention also comprises all or part of the following arrangements, considered separately or in all their combinations:

(a) the curved support is made of a material capable of taking an electrostatic charge simply by friction, for example the material known by the name "Plexiglas."

In this way, when the said support is thus charged it is only necessary to apply a sheet of paper for said sheet to adapt itself to the support over its entire surface without deformation and without any risk of slipping.

(b) the inside diameter and the length of the ink injection nozzle provided on the ink container are determined in dependence on the speed of rotation and the viscosity of the ink used in such manner that the ink ejection is effected in accordance with laminar flow.

This determniation may be effected by means of tests. It ensures the essential advantage that the recording trace is produced as a distinct and continuous line and not as a succession of spots of greater or lesser regularity.

(c) the difference in the radius between the support cylinder and the circle described by the tip of the nozzle is of the order of 1 to 5 millimetres.

One exemplified embodiment of the invention is shown by way of example only in the accompanying drawing, in which:

FIGURE 1 is a diagrammatic perspective view showing the complete apparatus according to the invention.
FIGURE 2 is a section on A—A in FIGURE 1.
FIGURE 3 is an axial section of the ink container.
FIGURE 4 shows an example of recording obtained by means of the instrument according to the invention.
FIGURE 5 is a partial side view of another embodiment of the apparatus of the present invention.
FIGURE 6 is a sectional view of the embodiment of FIGURE 5 taken along line 6—6 of FIG. 5.

With reference to FIGURE 1, it will be seen that the instrument comprises a base 1 carrying a column 2 on which a synchronous motor 3 is fixed.

On the shaft of said synchronous motor is mounted the ink container 4 provided with an ink ejection nozzle 5 perpendicular to the axis of rotation of the ink container.

On the same base is also mounted a column 6 which has a body or projectile 8 (for example a weighted hollow tube) suspended therefrom by an appropriate means 7 (for example an electromagnet).

A curved recording support 9 is fixed to the body 8.

Said support 9 has the shape of a portion of a cylinder the axis of which coincides with the axis of rotation of the ink container 4 and the radius of which is slightly greater than the radius of the circle described by the end of the nozzle 5.

The operation of the device is as follows:

The motor 3 is started by means of any appropriate contact. In consequence, the ink container rotates at the speed chosen. This rotation causes the ejection of ink through the nozzle 5 in a thin jet, the angular velocity of said nozzle being constant since the motor 3 is a synchronous motor.

The body 8 is released by any appropriate means and falls vertically before the ink container.

During its rotation, the latter records on the support 9 a trace of the kind shown in FIGURE 4.

In view of the cylindrical character of the support 9, the recording thus obtained permits not only measurement of instantaneous speeds by a study of the values of the angles α between the horizontal and the recorded trace at the point under consideration, but also, by a study of the arithmetic progression between the points a, b, c, d situated on a vertical, determination of the acceleration of the motion of the body 8.

When the support is not curved, as described in the application, the values of the angles α cannot be determined with precision. Similarly, if the nozzle is not sufficiently long or sufficiently thin for the flow of ink to be uniform, the traces obtained are not sufficiently regular and fine for the determination of the points a, b, c, d to be sufficiently precise for exact measurement.

It is obvious that the measurements explained hereinabove depend on the other elements of the instrument (radius of the cylinder of the support 9 and speed of the motor).

FIGURE 3 shows the structure of the ink container with its nozzle in greater detail.

By way of example, with an ink container constructed in dependence on the following data:

| | |
|---|---|
| Diameter of duct | 16/100 millimetre. |
| Inside diameter of ink container | 22 millimetres. |
| Viscosity of the ink used at 24° C. | 17 centipoises. |
| Number of revolutions per minute of motor | 3000 r.p.m. | and a gap of 2 to 3 millimetres between the end of the nozzle 5 and the support 9, gravity acceleration measurements such as $g=979.75$ were obtained, and this shows the precision of the instrument.

As will be seen in FIGURE 3, the ink container comprises a main body 4, a piece 11 whereby it is fitted on the shaft of the motor, a block 12 carrying the nozzle 5 and a top aperture 13 for filling it.

As has been described hereinabove, the support 9 will preferably be constructed from a material adapted to be charged with static electricity by friction, for example the material known by the name "Plexiglas." It is then sufficient to put the said support in position, then to apply to it a sheet of paper which adheres very effectively to the support over its entire surface.

The suspension system will preferably be a system comprising essentially an electromagnet, thus permitting easy orientation and precise positioning of the support 9 in relation to the ink container, and the release of the body 8 simply by breaking the current of the electromagnet without any danger of modifying the above-mentioned adjustment.

As shown in FIGURE 1, the body 8 is a hollow tube terminating in an end which can be weighted and the support 9 is connected by collars 10 to the hollow body.

The instrument as hereinabove described is particularly adapted to measurement of gravity but it is obvious that the invention may be easily modified by those versed in the art to measure other speeds or accelerations.

The invention furthermore comprises the modification consisting in replacing the ink container by an optical device giving an extremely fine pencil of light rotating at constant speed perpendicularly to the axis of the cylinder of the support 9, which latter is then provided with photographic paper.

Such an embodiment is shown in FIGURES 5 and 6 of the drawings. FIGURE 5, which is a partial side view of the aforementioned modification of the present invention, illustrates a portion of a body 8 to which a curved surface 9' is attached and which in turn carries a light-sensitive paper 26 attached thereto as can be best seen in the cross section of FIGURE 6. The body 8, only a portion of which is shown in FIGURE 5, is otherwise constructed in a similar manner as shown in FIGURE 1 and may be mounted to be released for free fall in the same manner as shown in FIGURE 1 and as described above in connection with FIGURE 1. A drive motor 3, preferably a synchronous motor, is mounted in the same manner as more clearly shown in FIGURE 1 with the axis thereof in the center of curvature of the curved surface 9', and this motor carries in optical device 20 for turning movement about the motor axis. The optical device 20 produces a fine pencil of light in any well known manner. For instance, the optical device may be in the form of a tube 23 carrying adjacent one end thereof a light source 24 and on the other end thereof an optical system 23 which will concentrate the light rays 22 emanating from the light source 24 to a point on the recording surface 9. The specific manner in which pointed light ray is produced does not form part of the present invention and this ray could be produced in any well known manner different from the manner schematically illustrated in FIGURE 6.

I claim:

1. A device for measuring accelerations and speed comprising, in combination, support means; a body releasably mounted on said support means so as to fall freely along a rectilinear path upon release; an elongated recording surface extending in direction of said rectilinear path and fixed to said body for movement therewith; and trace producing means adjacent said path and slightly spaced from said recording surface for producing substantially continuous traces extending in a direction transverse to the movement of said body in predetermined timed intervals on said recording surface, so that the acceleration of said body can be determined by the angle between said traces and a line normal to the direction of movement of said body, said recording surface and trace producing means as well as said support means and said body during its fall being out of mechanical contact with each other.

2. A device for measuring acceleration and speed comprising, in combination, support means; a body releasably mounted on said support means so as to fall freely along a rectilinear path upon release; an elongated recording surface extending in direction of said rectilinear path and fixed to said body for movement therewith; and trace producing means adjacent said path and slightly spaced from said recording surface for producing substantially continuous traces extending in a direction transverse to the movement of said body in predetermined uniformly spaced intervals on said recording surface, so that the acceleration of said body can be determined by the angle between said traces and a line normal to the direction of movement of said body, said recording surface and said trace producing means as well as said support means and said body during its fall being out of mechanical contact with each other.

3. A device for measuring acceleration and speed comprising, in combination, a body moveable along a rectilinear path; an elongated recording surface extending in direction of said rectilinear path and fixed to said body for movement therewith along said rectilinear path and being uniformly curved throughout the length thereof in a direction transverse to said path to form at least part of a cylinder having an axis parallel to said rectilinear path; trace producing means turnable about said axis for producing on said recording surface substantially continuous traces extending transverse to the movement of said body; and means for rotating said trace producing means at constant speed about said axis, so that the acceleration of said body can be determined by the angle between said traces and a line normal to the direction of movement of said body, said recording surface and said trace producing means being out of mechanical contact with each other.

4. A device for measuring acceleration and speed, comprising, in combination, support means; a body releasably mounted on said support means so as to fall freely along a rectilinear path upon release; an elongated recording surface extending in direction of said rectilinear path and fixed to said body for movement therewith along said rectilinear path and being uniformly curved throughout the length thereof in a direction transverse to said path to form at least part of a cylinder having an axis parallel to said rectilinear path; trace producing means turnable about said axis for producing on said recording surface substantially continuous traces extending transverse to the movement of said body; and means for rotating said trace producing means at constant speed about said axis, so that the acceleration of said body can be determined by the angle between said traces and a line normal to the direction of movement of said body, said recording surface and said trace producing means as well as said support means and said body during its fall being out of mechanical contact with each other.

5. A device for measuring acceleration and speed, comprising, in combination, support means; a body releasably mounted on said support means so as to fall freely along a rectilinear path upon release; trace producing means turnable at constant speed about an axis parallel to said rectilinear path, said trace producing means including an ink container having an ejection nozzle substantially normal to said rectilinear path, and means for rotating said ink container at constant speed about said axis; and an elongated recording surface extending in direction of said rectilinear path and fixed to said body for movement therewith along said rectilinear path and being uniformly curved throughout the length thereof in a direction transverse to said path to form at least part of a cylinder coaxial with the axis of rotation of said trace producing means, whereby said trace producing means will produce traces extending transverse to the movement of said body so that the acceleration of said body can be determined by the angle between said traces and a line normal to the movement of said body, said recording surface and said trace producing means as well as said support means and said body during its fall being out of mechanical contact with each other.

6. A device for measuring acceleration and speed, comprising, in combination, support means; a body releasably mounted on said support means so as to fall freely along a rectilinear path upon release; trace producing means turnable at constant speed about an axis parallel to said rectilinear path, said trace producing means including an ink container having an ejection nozzle substantially normal to said rectilinear path, and means for rotating said ink container at constant speed about said axis; and an elongated recording surface extending in direction of said rectilinear path and fixed to said body for movement therewith along said rectilinear path and being uniformly curved throughout the length thereof in a direction transverse to said path to form at least part of a cylinder coaxial with the axis of rotation of said trace producing means, whereby said trace producing means will produce traces extending transverse to the movement of said body so that the acceleration of said body can be determined by the angle between said traces and a line normal to the movement of said body, the free end of said ejection nozzle being slightly spaced from said recording surface.

7. A device for measuring acceleration and speed, comprising, in combination, support means; a body releasably mounted on said support means so as to fall freely along a rectilinear path upon release; trace producing means turnable at constant speed about an axis parallel to said rectilinear path, said trace producing means including optical means for producing a light ray, and means for rotating said light ray at constant speed about said axis in a plane normal to said rectilinear path; an elongated recording surface extending in direction of said rectilinear path and fixed to said body for movement therewith along said rectilinear path and being uniformly curved throughout the length thereof in a direction transverse to said path to form at least part of a cylinder coaxial with the axis of rotation of said trace producing means; and a photographic copy material fixedly mounted on said recording surface, whereby said trace producing means will produce traces extending transverse to the movement of said body so that the acceleration of said body can be determined by the angle between said traces and a line normal to the movement of said body.

References Cited in the file of this patent

UNITED STATES PATENTS

| | | |
|---|---|---|
| 1,597,487 | St. Clair | Aug. 24, 1926 |
| 1,917,847 | Klopsteg | July 11, 1933 |
| 2,124,547 | Port | July 26, 1938 |
| 2,575,742 | Baltin et al. | Nov. 20, 1951 |
| 2,804,306 | Chedister et al. | Aug. 27, 1957 |

FOREIGN PATENTS

| | | |
|---|---|---|
| 11,933 | Great Britain | 1905 |
| 382,573 | Germany | Oct. 4, 1923 |
| 1,107,221 | France | Dec. 29, 1955 |